(12) United States Patent
Dang Van Nhan

(10) Patent No.: US 8,160,768 B2
(45) Date of Patent: Apr. 17, 2012

(54) DEVICE AND METHOD FOR DETERMINING THE VALUE OF A BINARY ITEM, DELIVERED IN A REDUNDANT MANNER, AND REPRESENTATIVE OF A PARAMETER OF A SYSTEM

(75) Inventor: Christophe Dang Van Nhan, Villejuif (FR)

(73) Assignee: Renault S.A.S., Boulogne-Billancourt (FR)

( * ) Notice: Subject to any disclaimer, the term of this patent is extended or adjusted under 35 U.S.C. 154(b) by 847 days.

(21) Appl. No.: 12/158,457

(22) PCT Filed: Nov. 21, 2006

(86) PCT No.: PCT/FR2006/051207
§ 371 (c)(1),
(2), (4) Date: Oct. 7, 2008

(87) PCT Pub. No.: WO2007/071857
PCT Pub. Date: Jun. 28, 2007

(65) Prior Publication Data
US 2009/0306845 A1 Dec. 10, 2009

(30) Foreign Application Priority Data
Dec. 22, 2005 (FR) ...................... 05 13193

(51) Int. Cl.
*G01M 17/00* (2006.01)
*G06F 7/00* (2006.01)
*G06F 19/00* (2006.01)

(52) U.S. Cl. ..................... 701/29.1; 701/29.7

(58) Field of Classification Search .................... 714/40, 714/41, 42; 713/400; 701/29, 34; 188/156; 180/370; 303/20
See application file for complete search history.

(56) References Cited

U.S. PATENT DOCUMENTS 4,930,083 A * 5/1990 Hoashi et al. .................... 701/79
5,016,587 A 5/1991 Berger et al.
(Continued)

FOREIGN PATENT DOCUMENTS
WO 00 24618 5/2000

OTHER PUBLICATIONS

Written Opinion of the International Searching Authority issued Mar. 13, 2007 in PCT/FR2006/051207 filed Nov. 21, 2006.

*Primary Examiner* — Mary Cheung
*Assistant Examiner* — Kyle K Tsui
(74) *Attorney, Agent, or Firm* — Oblon, Spivak, McClelland, Maier & Neustadt, L.L.P.

(57) ABSTRACT

A device for determining a value of a binary item, delivered in a redundant manner by two distinct determination mechanisms, and representative of a parameter of a system, the binary item being equal to a first or a second value when the parameter lies respectively in a first or a second range of values, the first and second ranges of values being separated by a transient range of values in which the transitions of value of the binary item transmitted respectively by the determination mechanisms occur. The system includes a state machine that assigns, when one of the determination mechanisms delivers a binary item devoid of any transition of value on account of a malfunction, respectively the first or second predetermined value delivered by the other determination mechanism, which is operating normally, when the parameter lies in the first or second range of values.

14 Claims, 7 Drawing Sheets

U.S. PATENT DOCUMENTS

| | | |
|---|---|---|
| 5,954,407 A | 9/1999 | Schramm et al. |
| 6,318,819 B1 | 11/2001 | Bohm et al. |
| 6,345,225 B1 | 2/2002 | Bohm et al. |
| 6,899,080 B2 * | 5/2005 | Pursifull et al. ............... 123/399 |
| 7,054,732 B2 * | 5/2006 | Rieger et al. .................... 701/67 |
| 2005/0061563 A1 | 3/2005 | Syed et al. |

* cited by examiner

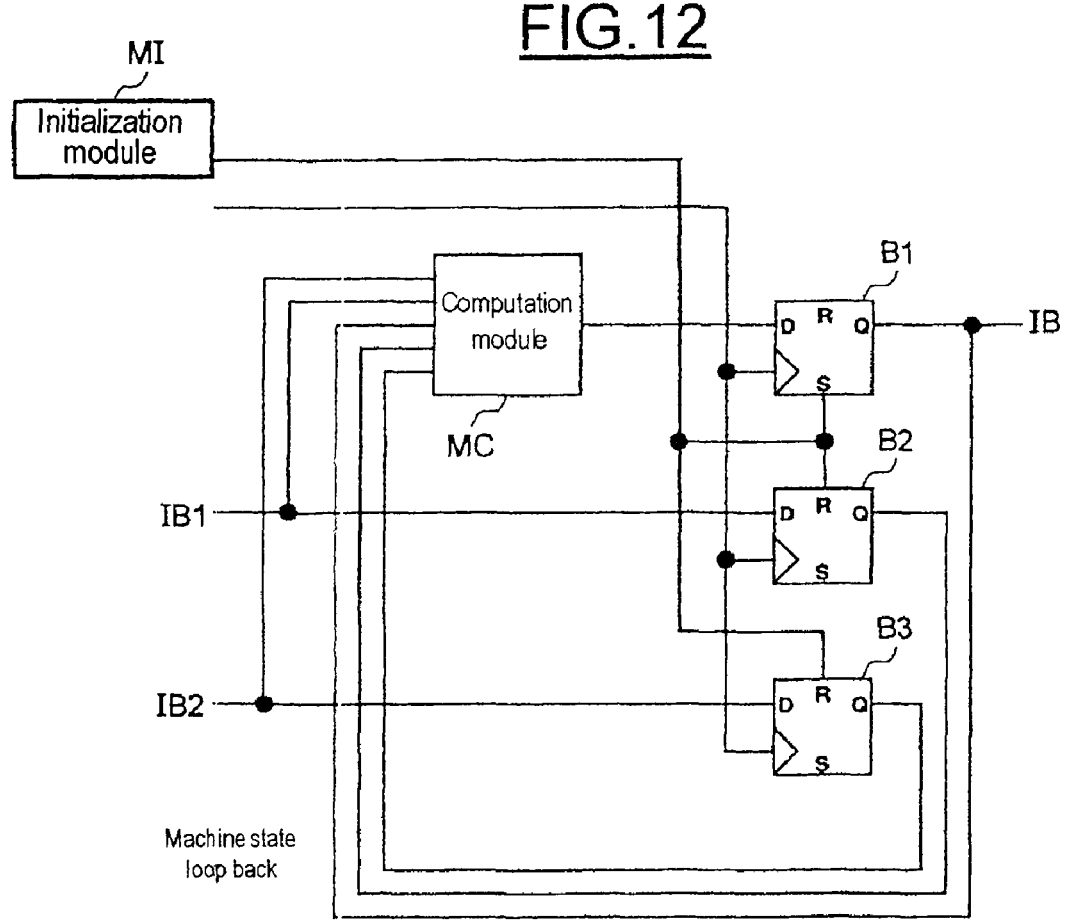

DEVICE AND METHOD FOR DETERMINING THE VALUE OF A BINARY ITEM, DELIVERED IN A REDUNDANT MANNER, AND REPRESENTATIVE OF A PARAMETER OF A SYSTEM

BACKGROUND

The present invention relates to a device and a method for determining the value of a binary item, delivered in a redundant manner, and representative of a parameter of a system.

When there is a desire to determine the value of a binary item representative of a parameter of a system, for example the "pressed" or "released" position of a pedal, it is possible to use a determination element such as a measurement sensor of the "on/off" type which indicates the state of the system.

The binary item then represents the state of the system. In such a case, a failure of this sensor or of the data acquisition subsystem for this sensor can cause any binary item to be lost or erroneous binary item to be delivered.

The addition of a second, independent, determination element, for example a second similar sensor, provides a way of ensuring that, should one determination element fail, a correct binary item will still be transmitted by the second determination element.

However, when the two binary items respectively transmitted by the two determination elements are contradictory, there is no way of knowing which one is correct. This can occur, for example, when one of the determination elements is malfunctioning and transmitting a constant binary item.

The addition of a third determination means, for example a third sensor, would eliminate this contradiction. However, the addition of a third determination element is excessively costly compared to a solution with two determination elements.

There are systems managing the redundancy of a binary item transmitted by two determination elements.

The document U.S. Pat. No. 5,016,587 uses a time correlation with which to detect the inconsistencies and identify the defective sensor after using complex and costly processing operations.

BRIEF SUMMARY

One aim of the invention is to manage the redundancy of the binary item effectively and less expensively.

Also, according to one aspect of the invention, there is proposed a device for determining the value of a binary item, delivered in a redundant manner by two distinct determination means, and representative of a parameter of a system. Said binary item is equal to a first or a second value when said parameter lies respectively in a first or a second range of values. Said first and second ranges of values are separated by a transient range of values in which the transitions of value of the binary item, respectively transmitted by said determination means, occur. The device comprises decision means, comprising a state machine, suitable for assigning, when one of said determination means delivers a binary item devoid of any transition of value because of a malfunction, respectively said first or second predetermined value delivered by the other determination means, which is operating normally, when said parameter lies in said first or second range of values.

Thus, when one of the two determination means is defective or, in other words, when the binary item that it transmits no longer presents any transition, the binary item representative of the parameter of the system continues to be determined correctly from the transitions of the determination element that is not defective.

Furthermore, such a device is less expensive and less complex.

Advantageously, said decision means are suitable for assigning said first value to said binary item when said determination means operate normally and deliver said first value when said parameter lies in said first range of values, and for assigning said second value to said binary item when said determination means operate normally and deliver said second value when said parameter lies in said second range of values.

Thus, when the two determination means operate normally, outside the transition range for the parameter represented, the binary item is correctly determined.

In the first embodiment, said decision means comprise a machine with two states, a first state and a second state respectively corresponding to the binary item equal to said first and said second values. Said machine with two states is suitable for performing a change of state from the first state to the second state when a transition from said first value to said second value occurs for said binary item delivered by one of said determination means, and for performing a change of state from the second state to the first state when a transition from said second value to said first value occurs for said binary item delivered by one of said determination means.

Such a machine with two states makes it possible to deliver a correct binary item, even if one of the two determination means is malfunctioning, and transmitting a binary item devoid of transition.

Advantageously, the device also comprises initialization means suitable for initializing said state machine with a predetermined state from said first and second states.

Thus, it is possible to prioritize a state default.

In another embodiment, said decision means comprise a machine with six states, three first states and three second states respectively corresponding to said binary item equal to said first value and said second value, suitable for performing a change of state according to pairs of values of said binary item transmitted by said transmission means.

Such a state machine operates on the states, and is easy to implement.

Advantageously, the device also comprises initialization means suitable for initializing said state machine with a predetermined state.

In an embodiment, said machine with six states comprises an additional initialization state corresponding to said first value or to said second value.

Advantageously, a state is represented by three binary elements, the first binary element being equal to said binary item determined by the decision means, the second binary element being equal to the value of the binary item transmitted by one of said determination means, and the third binary element being equal to the binary item value transmitted by the other determination means.

Advantageously, said machine with six states comprising an additional initialization state, the additional initialization state is represented by the first binary element being equal to said first value and the second and third binary elements being equal to said second value, or by the first binary element being equal to said second value and the second and third binary elements being equal to said first value.

In a preferred embodiment, said binary item being computer-encoded on one bit, said bit representing said first value when it is zero and said second value when it is one.

Advantageously, said state machine is implemented in synchronous logic comprising three flip-flops, an initialization module, a timing clock and a computation module.

Such an implementation is easy and inexpensive.

For example, the binary item is representative of the position of a brake pedal of a motor vehicle, delivered in a redundant manner by two brake pedal position sensors.

According to another aspect of the invention, there is also proposed a method of determining the value of a binary item, delivered in a redundant manner by two distinct determination means, and representative of a parameter of a system. Said binary item is equal to a first or a second value when said parameter lies respectively in a first or a second range of values, said first and second ranges of values being separated by a transient range of values in which the transitions of values of the binary item respectively transmitted by said determination means occur. A state machine is used, and, when one of said determination means delivers a binary item devoid of any transition of value because of a malfunction, respectively said first or second predetermined value delivered by the other determination means which is operating normally, is assigned when said parameter lies in said first or second ranges of values.

BRIEF DESCRIPTION OF THE DRAWINGS

Other aims, characteristics and advantages of the invention will become apparent from reading the following description, of a few examples that are in no way limiting, and referring to the appended drawings, in which:

FIGS. 11 and 12 represent an example of implementation of the devices of FIGS. 9 and 10, in synchronous logic, according to one aspect of the invention.

DETAILED DESCRIPTION

The invention applies to any parameter of a system represented by a binary item delivered in a redundant manner and by two distinct determination modules.

The determination modules can, for example, be evaluation modules or sensors.

The binary item is equal to a first or a second value when the parameter that it represents lies respectively in a first or second range of values, the first and second ranges of values being separated by a transient range of values in which the transitions of values of the binary item, respectively transmitted by the two determination modules, occur.

Hereinafter in the description, the first value is equal to 0 and the second value is equal to 1. Obviously, the invention applies to any other pair of first and second values.

Furthermore, as an example, the binary item can represent the state of a pedal having a continuous travel, but for which all that needs to be known is whether it is "pressed" or "released", such as a brake pedal of a motor vehicle.

For a brake pedal, it is therefore necessary to produce a "released" value in a well-defined start-of-travel range, and a "pressed" value in an equally well-defined end-of-travel range. Thus, these two ranges of values are separated by a transition range in which the transitions between the "released" and "pressed" values occur.

Obviously, the invention applies to any other parameter of a system for which there is a desire to know a state that can take two values.

Thus, hereinafter in the description, three ranges of values will be named: range0, range3 and range1, respectively corresponding to the ranges of values of the parameter for which the binary item is respectively equal to 0 (first value), 0 or 1 in the transition range (first or second value) and 1 (second value).

Figure 1:
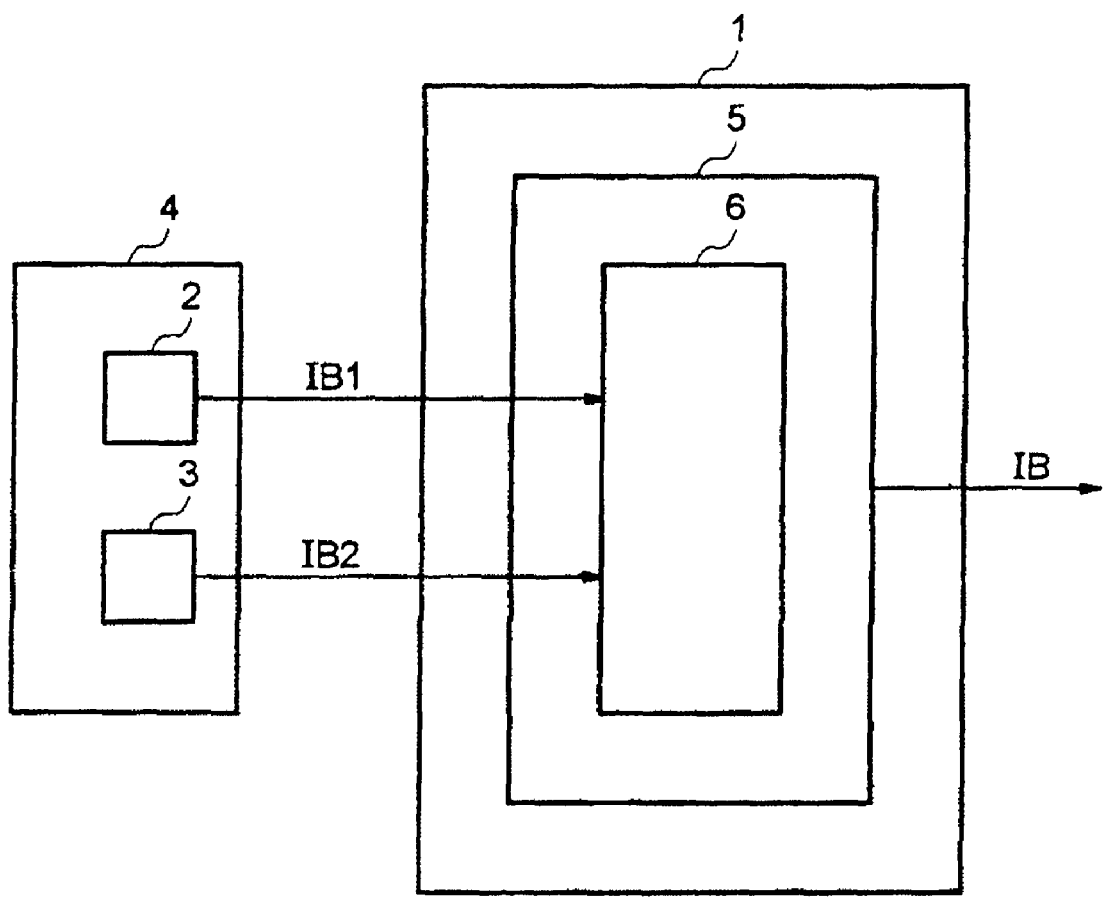
FIG. 1 represents a device according to one aspect of the invention.

As illustrated in FIG. 1, a determination device 1 receives a redundant binary item IB1, IB2, respectively transmitted by two determination modules 2, 3.

The binary item IB1, IB2 supplied in a redundant manner is representative of a parameter of a system 4.

The binary item IB1 and the binary item IB2 are processed directly by a decision module 5 of the device 1.

The redundancy of the binary item IB1, IB2 is processed using a machine with 6 states of the decision means 5, making it possible to correctly determine the value of the binary item IB when one of the determination modules 2, 3 delivers a binary item devoid of any transition of value because of a malfunction.

Thus, the device makes it possible to correctly determine the value of the binary item, even when one of the two determination modules 2, 3 malfunctions or fails.

Figure 2:
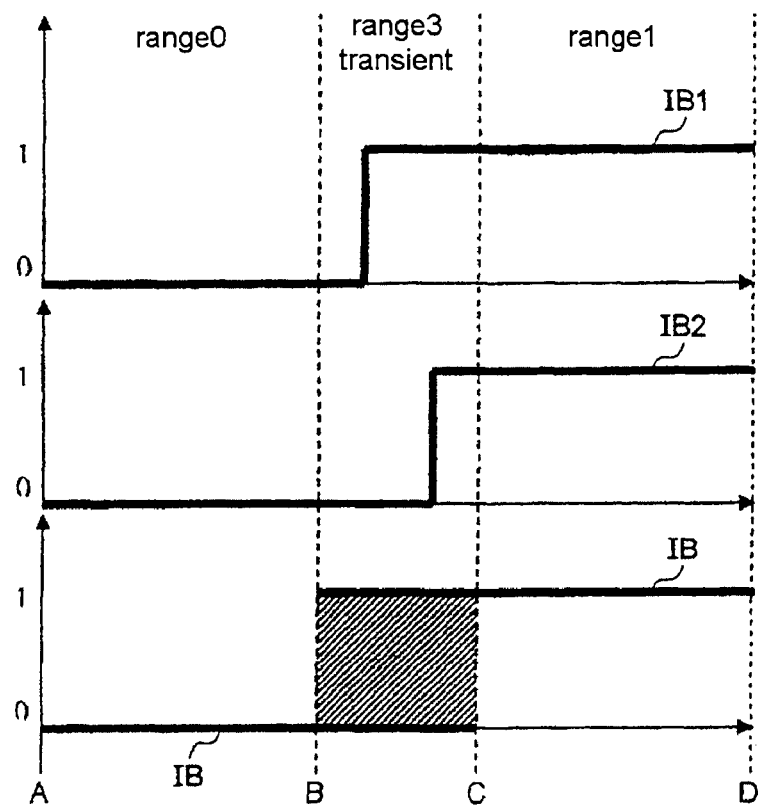
FIG. 2 represents the value of the binary item supplied by the determination means and delivered by the decision means, which are operating normally, according to ranges of values of the parameter that they represent, according to one aspect of the invention.

FIG. 2 illustrates the operation of the device of FIG. 1, when the two determination modules 2 and 3 are operating nominally or normally.

A first curve IB1 represents the value of the binary item transmitted by the first determination module 2 which is equal to zero in the first range of values, range0, corresponding to the parameter represented lying between a value A and a value B. The value of the binary item IB1 transmitted by the first determination module is equal to one when the parameter represented lies in the second range of values, range1, for the corresponding parameter lying between a value C greater than the value B and less than the value D.

The transition from the value zero (first value) to the value 1 (second value) of the binary item IB1 occurs in the transient range corresponding to a value of the parameter represented lying between the value B and the value C. This transition occurs for any value of the parameter represented lying between the value B and the value C.

For a nominal mode of operation of the system 4, the appearance of the curve of the binary item IB2 transmitted by the second determination module 3 is similar.

The transition from the value zero to the value one of the binary item IB2 occurs for any value of the parameter represented lying between the value B and the value C, independently of the transition value of the binary item IB1.

The binary item IB deduced from the redundancy of the two binary items IB1 and IB2, and delivered as output from the device 1 by the decision module 5, is equal to zero in the range range0, and one in the range range1.

The shaded part, corresponding to a parameter value represented by the binary item lying between the value B and the value C, illustrates the fact that the transition from the value zero to the value one can occur for any value of the parameter lying in the transient range range3.

The following figures explain the operation of a device according to FIG. 1, which can be used to deliver as output a correct binary item IB even when one of the determination modules 2, 3 supplies a binary item devoid of any transition, on a malfunction.

Figure 3:
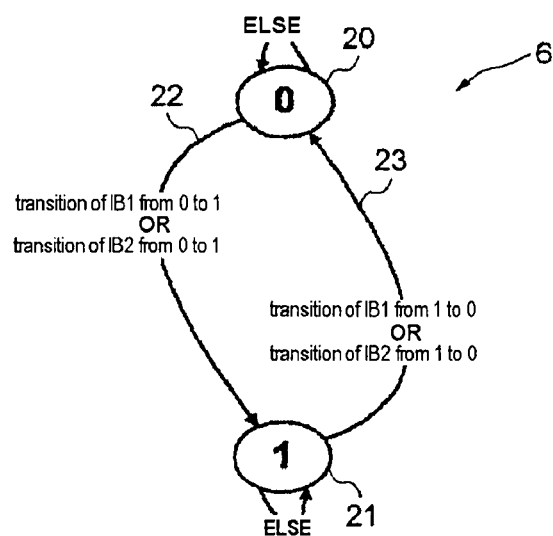
FIG. 3 represents a machine with two states of the decision means of the device according to one aspect of the invention.

FIG. 3 represents a machine with two states 6 with changes of state based on transition conditions of the binary items IB1, IB2 supplied by the determination modules 2, 3.

The machine with two states 6 comprises a first binary state 20 corresponding to the binary item IB being equal to zero (first value), and a second state 21 corresponding to the binary item IB being equal to one (second value).

When the state machine 6 is in the state 20, corresponding to the binary item IB being equal to zero, if a transition from zero to one occurs for the binary item IB1 or for the binary item IB2, then the state machine 6 changes to the state 21 corresponding to the binary item IB being equal to one, and remains in the state 20 corresponding to the binary item IB being equal to zero otherwise.

Furthermore, when the state machine 6 is in the second state 21 corresponding to the binary item IB being equal to one, if a transition from one to zero occurs for the binary item IB1 or for the binary item IB2, the state machine 6 changes to the state 20 corresponding to the binary item IB being equal to 0.

In this embodiment, the transition conditions for the state machine 6 relate to the transitions of values of the redundant binary items IB1 and IB2.

Figure 4:
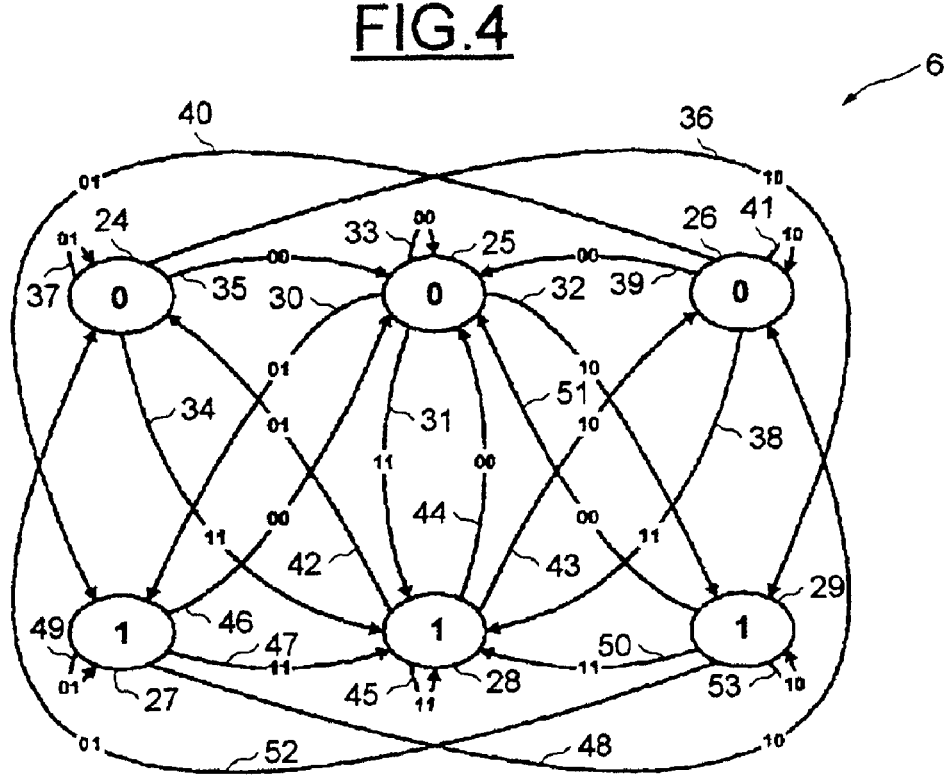
FIG. 4 represents a machine with six states of the decision means of the device according to another aspect of the invention.

FIG. 4 represents one embodiment of the state machine 6 comprising six states. It represents a transposition of the state machine of FIG. 3 into a state machine with change-of-state conditions on the values of the binary items IB1 and IB2, and not on the transitions of the binary items IB1 and IB2.

Three states 24, 25, 26 correspond to a binary item delivered by the state machine 6 being equal to zero, and three states 27, 28, 29 correspond to a binary item IB delivered by the state machine 6 being equal to one.

When the state machine 6 is in the state 25, if the binary items IB1 and IB2 are respectively equal to zero and one, then the state machine 6 changes to the state 27 via the transition 30, if the binary items IB1 and IB2 are both equal to one, the state machine 6 changes to the state 28 via the transition 31, and if the binary items IB1 and IB2 are respectively equal to one and zero, the state machine 6 changes to the state 29 via a transition 32. Furthermore, if the binary items IB1 and IB2 are both equal to zero, the state machine 6 remains in the state 25 via a transition 33.

When the state machine 6 is in the state 24, if the binary items IB1 and IB2 are both equal to one, the state machine 6 changes to the state 28 via a transition 34, and if the binary items IB1 and IB2 are both equal to zero, the state machine 6 changes to the state 25 via the transition 35. If the binary items IB1 and IB2 are respectively equal to one and zero, the state machine 6 changes to the state 29 via a transition 36, and if the binary items IB1 and IB2 are respectively equal to zero and one, the state machine 6 remains in the state 24 via a transition 37.

When the state machine 6 is in the state 26, if the binary items IB1 and IB2 are both equal to one, the state machine 6 changes to the state 28 via a transition 38, and if the binary items IB1 and IB2 are both equal to zero, the state machine 6 changes to the state 25 via a transition 39. If the binary items IB1 and IB2 are respectively equal to zero and one, the state machine 6 changes to the state 27 via a transition 40, and if the binary items IB1 and IB2 are respectively equal to one and zero, the state machine 6 remains in the state 26 via a transition 41.

When the state machine 6 is in the state 28, if the binary items IB1 and IB2 are respectively equal to zero and one, the state machine 6 changes to the state 24 via a transition 42, and if the binary items IB1 and IB2 are respectively equal to one and zero, the state machine 6 changes to the state 26 via a transition 43. If the binary items IB1 and IB2 are both equal to zero, the state machine 6 changes to the state 25 via a transition 44, and if the binary items IB1 and IB2 are both equal to one, the state machine 6 remains in the state 28 via a transition 45.

When the state machine 6 is in the state 27, if the binary items IB1 and IB2 are both equal to zero, the state machine 6 changes to the state 25 via a transition 46, and if the binary items IB1 and IB2 are both equal to one, the state machine 6 changes to the state 28 via a transition 47. If the binary items IB1 and IB2 are respectively equal to one and zero, the state machine 6 changes to the state 26 via a transition 48, and if the binary items IB1 and IB2 are respectively equal to zero and one, the state machine 6 remains in the state 27 via a transition 49.

When the state machine 6 is in the state 29, if the binary items IB1 and IB2 are both equal to one, the state machine 6 changes to the state 28 via a transition 50, and if the binary items are both equal to zero, the state machine 6 changes to the state 25 via a transition 51. If the binary items IB1 and IB2 are respectively equal to zero and one, the state machine 6 changes to the state 24 via a transition 52, and if the binary items IB1 and IB2 are respectively equal to one and zero, the state machine 6 remains in the state 29 via a transition 53.

Figure 5:
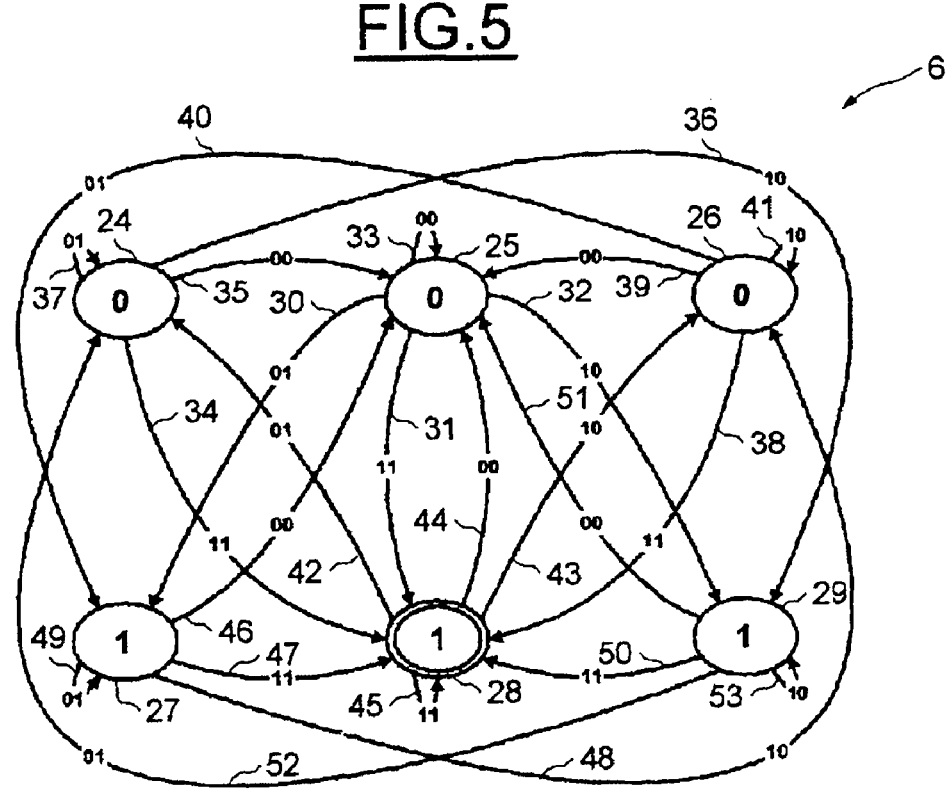
FIGS. 5 and 6 represent an initialization of a device according to FIG. 4, according to one aspect of the invention.

FIG. 5 illustrates a state machine 6 according to FIG. 4, in which the state 28 is chosen as the initialization state in order to prioritize a transition of the state machine 6 to a state corresponding to the binary item IB being equal to 0. In practice, when the state 28 is chosen as the initialization state, immediately one of the determination modules 2 or 3 transmits a binary item IB1 or IB2 that is equal to zero, the state machine 6 changes to the state 24, 25 or 26 corresponding to a binary item IB delivered as output equal to zero, respectively via the transition 42, 44 or 43.

Figure 6:
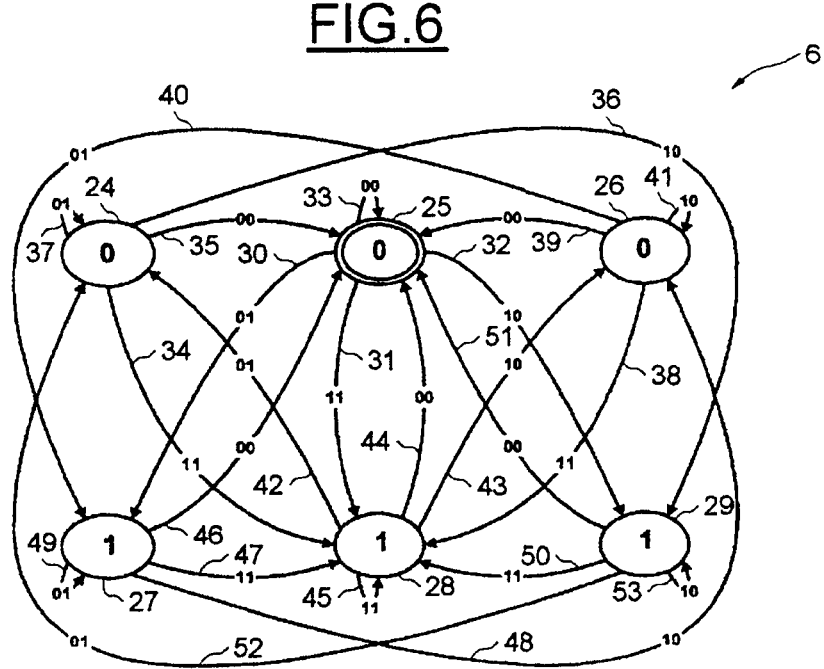

FIG. 6 illustrates a state machine 6 according to FIG. 4, in which the state 25 is chosen as the initialization state. For this embodiment, a transition of the state machine 6 to a state corresponding to a binary item IB delivered as output that is equal to one, is prioritized.

In practice, when the state machine 6 is in the state 25, immediately one of the two determination modules 2 or 3 transmits a binary item IB1 or IB2 that is equal to one, the state machine 6 changes to the state 27, 28 or 29 corresponding to a binary item delivered as output that is equal to 1, respectively via the transition 30, 31 or 32.

The devices of FIGS. 5 and 6 allow for a deterministic initialization of the device, before any transition occurs on one of the two binary items IB1 or IB2.

It is thus possible to prioritize a state of the state machine 6 for which the binary item IB is equal to zero, when, on first receipt of the binary items IB1 and IB2 transmitted via the determination modules 2 or 3, the binary items IB1 and IB2 present contradictory values.

In such a case, during the initialization cycle time, a state of the state machine 6 is declared which is not that which is prioritized in case of contradiction, but this is not critical in most applications, since the initialization cycle time is generally short enough not to pose any problems.

Figure 7:
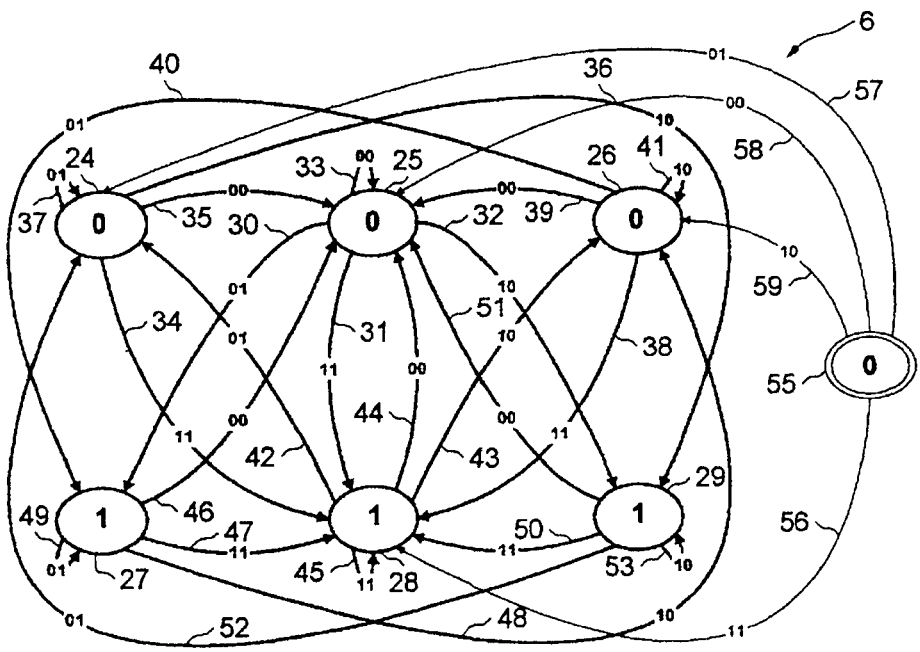
FIGS. 7 and 8 represent a refinement of a device according to FIG. 4, in which an additional initialization state is added, according to one aspect of the invention.

FIG. 7 illustrates a state machine 6 according to FIG. 4, also comprising an additional initialization state 55 for which the binary item IB is equal to 0.

When the state machine 6 is in the additional initialization state 55, if the binary items IB1 and IB2 received are both equal to one, the state machine 6 changes to the state 28 via a transition 56.

When the binary items IB1 and IB2 are respectively equal to zero and one, the state machine 6 changes to the state 24 via a transition 57. When the binary items IB1 and IB2 are both equal to zero, the state machine 6 changes to the state 25 via a transition 58, and when the binary items IB1 and IB2 are respectively equal to one and zero, the state machine 6 changes to the state 26 via a transition 59.

Thus, as for the embodiment of FIG. 5, a transition to a state of the state machine 6, in which the binary item IB delivered as output is equal to zero, is prioritized.

Furthermore, such a device makes it possible to avoid an undesirable transient state during the initialization cycle time, because, from initialization, the state machine 6 is in a state for which the binary item IB is equal to zero.

Figure 8:
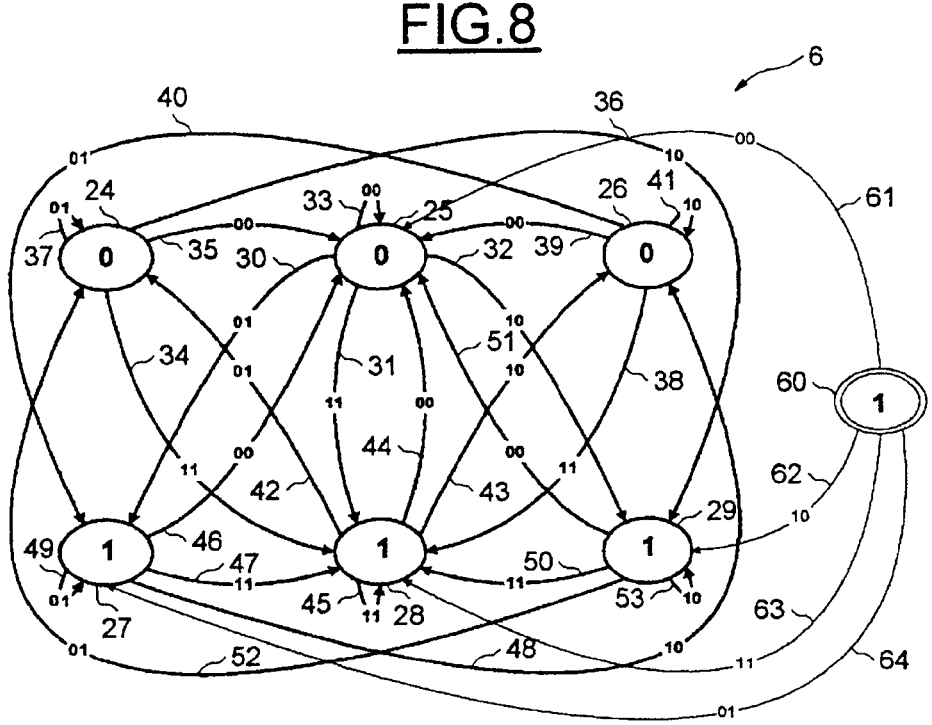

Similarly, FIG. 8 illustrates an embodiment according to FIG. 4, in which an additional initialization state 60 is added to the state machine 6, for which the binary item IB delivered as output is equal to one.

When the state machine 6 is in the state 60, if the binary items IB1 and IB2 supplied are both equal to zero, the state machine 6 changes to the state 25 via a transition 61. When the binary items IB1 and IB2 are respectively equal to one and zero, the state machine 6 changes to the state 29 via a transition 62, when the binary items IB1 and IB2 are both equal to one, the state machine 6 changes to the state 28 via a transition 63, and when the binary items IB1 and IB2 are respectively equal to zero and one, the state machine 6 changes to the state 27 via a transition 64.

Such a device makes it possible to favor an initialization state of the state machine 6, in which the output binary item is equal to one, without even observing any undesirable transient state during the initialization cycle time.

Figure 9:
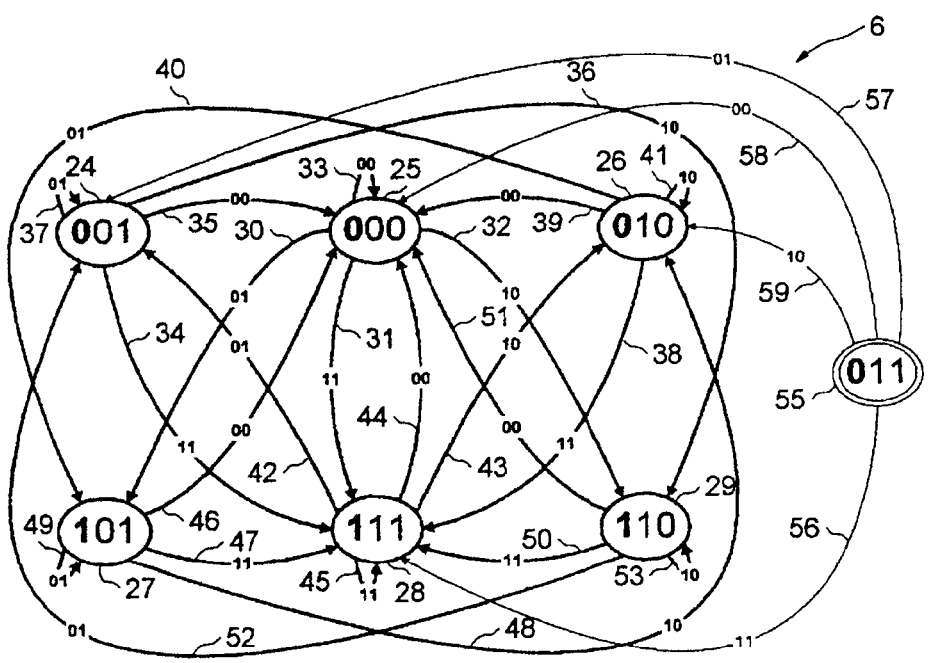
FIGS. 9 and 10 illustrate an optimization of the devices according to FIGS. 7 and 8, by coding a state of the machine.
Figure 10:
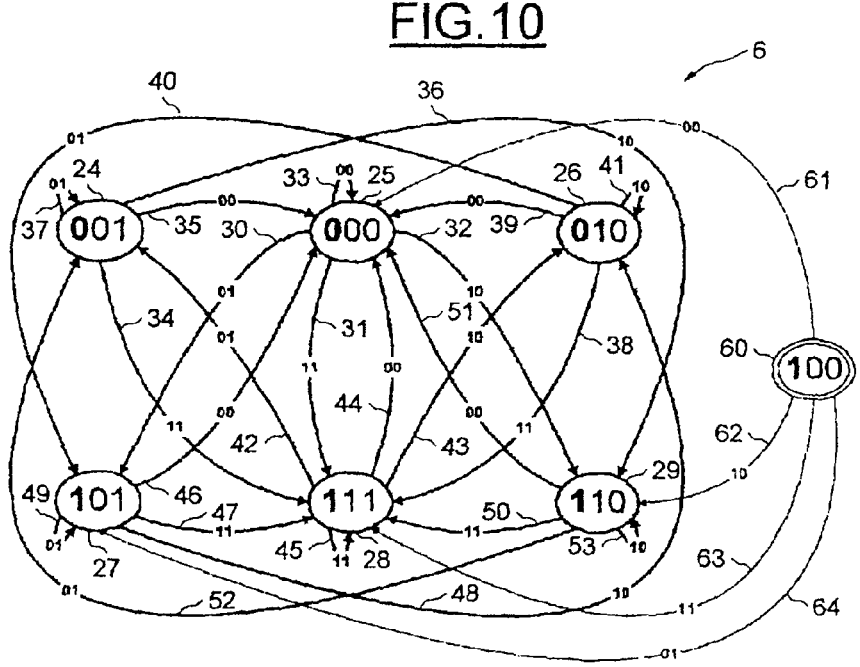

FIGS. 9 and 10 respectively illustrate an embodiment of the devices according to FIGS. 7 and 8. A state of the state machine 6 is represented by three binary elements, the first binary element being equal to the binary item IB delivered as output, the second binary element being equal to the value of the binary item IB1, and the third binary element being equal to the value of the binary item IB2.

In these examples, the binary items can take the value zero (first value) or one (second value). Obviously, these embodiments are valid for any other pair of first and second values.

The additional initialization states 55 and 60 are respectively represented by the triplet 011 and 100.

Thus, the state machine 6 can be easily implemented, since the value of the binary item to be delivered by the state machine 6 is straightforwardly the first of the three binary elements representing the current state of the state machine 6.

Furthermore, when the first value and the second value are zero and one, a state of the state machine can be encoded on just three bits.

Generally, for all the embodiments described, it is advantageous to take zero and one as first and second values of the binary items IB1, IB2 and IB, because then a single bit is enough to encode such a binary item.

Figure 11:
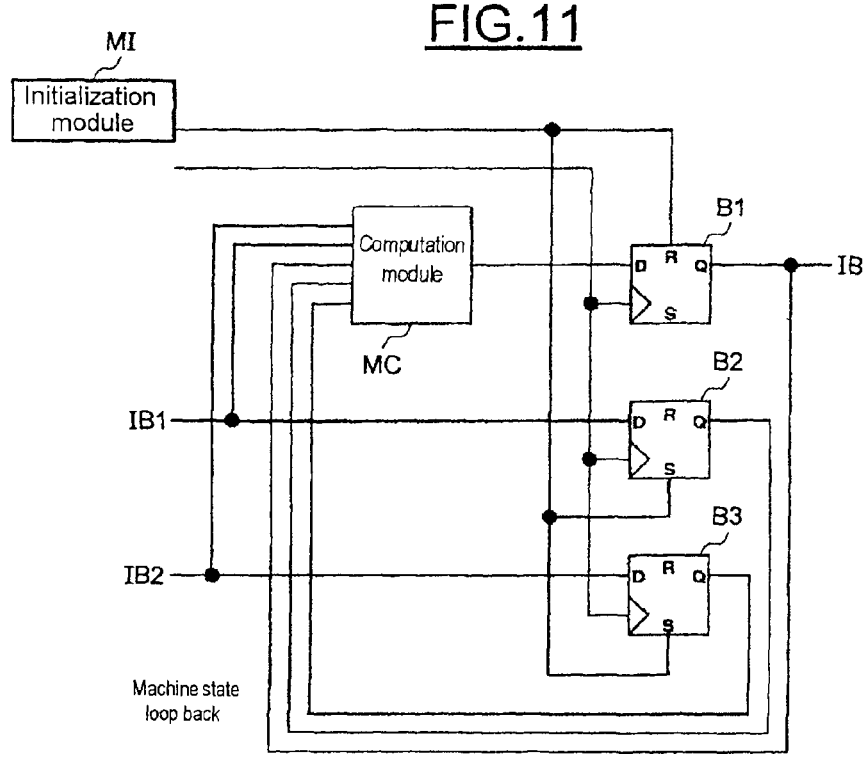

FIGS. 11 and 12 respectively illustrate an implementation in the form of synchronous logic of the state machines 6 according to FIGS. 9 and 10.

Obviously, the state machines 6 described previously can be implemented in software form, notably with an optimized coding of the states of the state machine 6.

The embodiments of FIGS. 11 and 12 comprise three flip-flops, B1, B2 and B3, an initialization module M1 and a computation module MC suitable for producing the first bit representing the first binary element encoding a state of the state machine 6, which is straightforwardly the value of the binary item IB delivered as output.

These two embodiments require no computation module to produce the last two bits representative of the last two binary elements encoding a state of the state machine 6.

In order to illustrate the above, we explain the case where the binary element is representative of the position of a brake pedal of a motor vehicle, delivered in a redundant manner by two brake pedal position sensors.

The position sensors are both pedal start-of-travel contacts, designed and adjusted so that they each supply a binary item that is equal to zero when the pedal is not stressed, and a binary item that is equal to one when the pedal is stressed enough to operate the brakes.

There is a transient range on the travel of the brake pedal located between the rest position of the pedal and the position of the brake pedal that begins to actually operate the brakes.

The contact that transmits the binary item IB1 and the contact that transmits the item IB2 are chosen arbitrarily, since the invention operates regardless of the order of switching of the sensors, the state machine 6 being perfectly symmetrical.

An initialization state is chosen according to the operating requirements of the brake pedal. Thus, an initialization with a "pressed" state is performed, because the dependability studies prove that it is preferable by default to signal a brake pedal in a "pressed" state, even if it is not actually pressed, rather than to signal a pedal in a "released" state, when it is not actually released.

It is indeed preferable to prioritize a state which leads to a "pressed" state of the brake pedal delivered by the state machine 6, for the safety of the passengers in the vehicle.

Thus, if a mechanical or electrical failure occurs on one of the contacts, causing the value of its transmitted binary item to remain fixed, the state machine 6 continues to function and to supply as output a binary item IB corresponding to the "pressed" or "released" state of the brake pedal, which is correct. There is no need to manage any degraded operating mode.

The invention claimed is:

1. A device for determining a value of a binary item of a system of a motor vehicle, the binary item being representative of a parameter of the system, delivered in a redundant manner by two sensors, the binary item being equal to a first or a second value when the parameter lies respectively in a first or a second range, the first and second ranges being separated by a transient range in which the binary item transitions between the first value and the second value, the device comprising:

decision means that receives a first binary item signal from a first sensor and a second binary item signal from a second sensor, the decision means comprising a state machine, including a memory or processor, configured to assign, when one of the sensors delivers a binary item devoid of any transition of value because of a malfunction, the first or second value as the binary item representative of the parameter of the system, wherein a value of the first binary item signal transitions between the first value and the second value and a value of the second binary item signal transitions between the first value and the second value, and wherein the state machine sets the binary item of the system equal to the value of the first or second binary item signal that had the most recent transition.

2. The device as claimed in claim 1, in which the decision means assigns the first value to the binary item when the first and second sensors operate normally and deliver the first value when the parameter lies in the first range, and assigns the second value to the binary item when the first and second sensors operate normally and deliver the second value when the parameter lies in the second range.

3. The device as claimed in claim 2, in which the state machine includes two states, a first state and a second state respectively corresponding to the binary item equal to the first and the second values, the state machine is changed from the first state to the second state when a transition from the first value to the second value occurs for the binary item delivered by one of the sensors, and the state machine is changed from the second state to the first state when a transition from the second value to the first value occurs for the binary item delivered by one of the sensors.

4. The device as claimed in claim 3, further comprising an initialization module to initialize the state machine with a predetermined state from the first and second states.

5. The device as claimed in claim 2, in which the state machine includes six states, three first states and three second states respectively corresponding to the binary item equal to the first value and the second value, and the state machine is changed according to pairs of values of the binary item transmitted by the sensors.

6. The device as claimed in claim 5, further comprising an initialization module to initialize the state machine with a predetermined state.

7. The device as claimed in claim 5, in which the state machine with the six states comprises an additional initialization state corresponding to the first value or to the second value.

8. The device as claimed in claim 5, in which each of the states is represented by three binary elements, the first binary element being equal to the binary item determined by the decision means, the second binary element being equal to the value of the first binary item signal transmitted by the first sensor, and the third binary element being equal to the value of the second binary item signal transmitted by the second sensor.

9. The device as claimed in claim 8, in which the state machine with the six states comprises an additional initialization state, the additional initialization state is represented by the first binary element being equal to the first value and the second and third binary elements being equal to the second value, or by the first binary element being equal to the second value and the second and third binary elements being equal to the first value.

10. The device as claimed in claim 1, in which the binary item and the binary elements are computer-encoded on one bit, the bit representing the first value when the bit is zero and the second value when the bit is one.

11. The device as claimed in claim 10, in which the state machine is implemented in synchronous logic comprising three flip-flops, an initialization module, a timing clock, and a computation module.

12. The device as claimed in claim 1, in which the binary item is representative of a position of a brake pedal of the motor vehicle, delivered in a redundant manner by two brake pedal position sensors.

13. A method of determining a value of a binary item of a system of a motor vehicle, the binary item being representative of a parameter of the system, delivered in a redundant manner by two sensors, the binary item being equal to a first or a second value when the parameter lies respectively in a first or a second range, the first and second ranges being separated by a transient range in which the binary item transitions between the first value and the second value, the method comprising:

sending, to a state machine, including a memory or processor, a first binary item signal from a first sensor and a second binary item signal from a second sensor, a value of the first binary item signal transitions between the first value and the second value and a value of the second binary item signal transitions between the first value and the second value; and assigning, via the state machine, when one of the sensors delivers a binary item devoid of transitions of value because of a malfunction, the first or second value as the binary item representative of the parameter of the system by setting the binary item equal to the value of the first or second binary item signal that had the most recent transition.

14. The method as claimed in claim 13, further comprising initializing the value of the binary item with a predetermined value from the first and second values.

* * * * *